June 1, 1926.
W. E. WINE
TRACTOR SHOE
Filed April 20, 1925
1,586,930
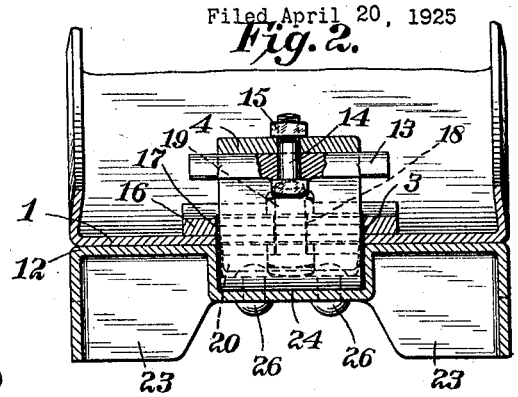
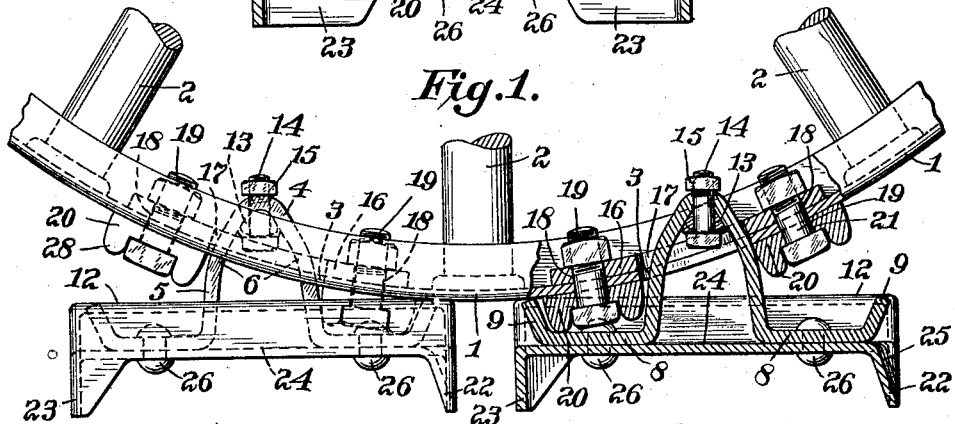
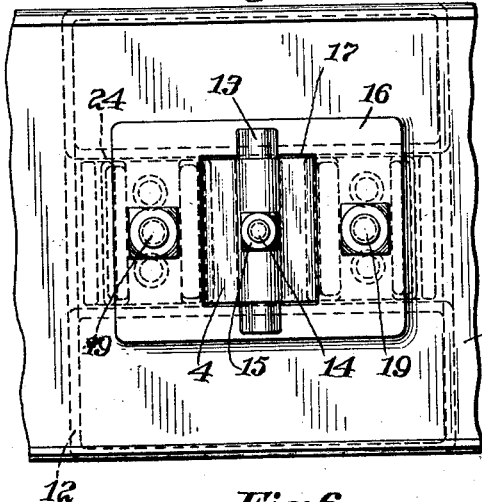
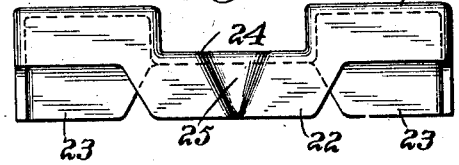
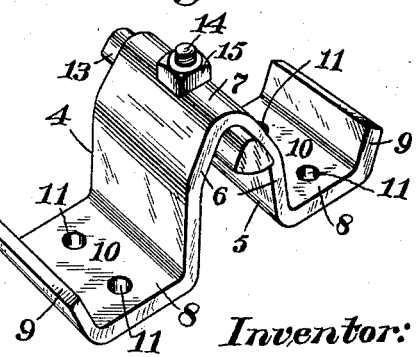
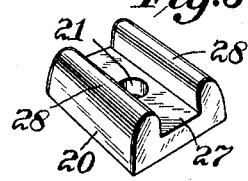
Inventor:
William E. Wine,
by Parker Cook
Atty.

Patented June 1, 1926.

1,586,930

UNITED STATES PATENT OFFICE.

WILLIAM E. WINE, OF TOLEDO, OHIO, ASSIGNOR TO THE TRACTOR GRIP WHEEL COMPANY, OF TOLEDO, OHIO, A CORPORATION OF OHIO.

TRACTOR SHOE.

Application filed April 20, 1925. Serial No. 24,461.

My invention relates to new and useful improvements in tractor shoes and has for an object to provide a shoe which may be readily and quickly applied to the metal rim of a wheel and will provide a maximum gripping effect with the surface over which the wheel is travelling.

The present application is somewhat similar in its broadest aspects to an application for tractor shoes filed by me on April 8, 1925, Serial Number 21,609. The present invention contemplates a somewhat different form of tread member and a different form of retaining means but the rocking action of the retaining means and shoe with relation to the wheel rim is the same.

One of the objects of the invention is to provide a shoe which may be quickly and readily applied to a tractor wheel regardless of the size or shape of the rim of the tractor wheel.

With a number of forms of shoes now in use, it is necessary to provide some form of clamping means, the clamping means being designed to extend over the rim of the wheel and due to the various widths of rims, a number of different size shoes has to be kept in stock, as the clamping means may be either too short or too long for the various sizes.

Furthermore, some of the tractor wheels have side flanges on the rims which ordinarily present certain difficulties, and another object, therefore, of my invention is to provide a shoe (and when I mention "shoe" I am speaking of the invention as a complete unit), wherein the retaining means pass through an opening cut in the rim of the wheel, and the tread of the shoe is in fixed relation with the retaining means, and the retaining means and tread capable of a rocking motion with regard to the rim.

Still another object of the invention is to provide a retaining means which is pressed from sheet or bar steel, the lower ends of which are adapted to fit within a channel formed in the tread member, and the retaining means and tread member securely locked by rivets so that they are in fixed relation with each other. The inner end of the retaining means is then passed through an opening cut in the rim and to retain it in its position, a short cross bar is furnished so that the retaining means, although retained in the opening of the rim is free to move slightly upwardly and downwardly and also free to rock or oscillate.

Still another object of the invention is to provide a small housing on the inner surface of the rim which may be of hard steel so that the bearing points for the cross bar will be lasting in effect and durable in service.

Still another object of this invention is to provide two small bearing members which are bolted to the outer surface of the rim which seat, as the wheel revolves, on the lower ends of the retaining means, which latter are fastened within a channel formed in the tread member.

Still another object of the invention is to provide a tractor shoe which is relatively light in weight, may be formed of sheet or bar metal, quickly and readily assembled and easily applied to the rim of the tractor.

With these and other objects in view, the invention consists in certain new and novel arrangements and combination of parts as will be hereinafter more fully described and pointed out in the claims.

Referring now to the drawings, showing a preferred embodiment of my invention:—

Fig. 1 is a fragmentary side elevation showing two of the shoes as attached to a tractor wheel, one of the shoes being shown in elevation and the other of the shoes being shown in section, and the shoes in the position they will occupy when in contact with the ground.

Fig. 2 is a cross sectional view, the wheel having revolved slightly, and the shoe being shown in contact throughout its width with the rim.

Fig. 3 is a fragmentary inner plan view looking from within the rim.

Fig. 4 is an end view of the tread member.

Fig. 5 is a perspective of the retaining means, and

Fig. 6 is a perspective of one of the bearings which is secured to the outer surface of the rim.

Referring now more specifically to the several views, there is fragmentarily shown a rim 1, and portions of spokes 2, the rims being provided with a series of openings 3 through which in turn are passed the apexes of the retaining members 4, which will be shortly described more in detail.

As the installation of all the shoes is the same, a description of one will be a description of all.

Referring now to the retaining means 4, and to Fig. 5 in particular, it will be seen that this member is preferably formed of bar or sheet steel comprising a substantial inverted U-shaped body 5, the walls of this body inclining inwardly as at 6 and the apex 7 being slightly rounded. Feet 8 are provided at the lower ends of the body portion 5, and these feet then extend upwardly a slight distance as at 9, forming the two small pockets 10. Openings 11 are provided in these legs so that this retaining member 4 may be riveted to the tread member 12 shortly to be described in detail.

Fitting within this retaining member 4, and at the inner edge of the U-shaped portion is a small cross bar 13 which is slightly greater in length than the breadth of the retaining member to thus extend beyond the sides of the retaining member. This bar is substantially triangular in shape, the several angles being rounded as may be readily seen in Fig. 5, and the outer surface being also slightly rounded to form a rocking bearing.

To retain this cross-bar in fixed relation in the retaining member there is shown a bolt 14 which is secured by the nut 15, the bolt, of course, passing through the cross bar and retaining member. The side walls of this cross bar conform in angularity to the angularity of the contacting walls of the retaining member so that the cross bar will be rigidly secured when held by the bolt.

Referring now to Figs. 1 to 3 inclusive, there is shown a housing 16 in the form of a metal plate which is placed on the inner surface of the tractor rim and is provided with a central opening 17 designed to register with the opening 3 in the rim of a wheel, and this plate is provided with bolt holes 18 on the opposite sides of the opening for the reception of the bolts 19 which also hold the small bearing members 20 to the rim of the wheel. These bearing members are placed on the outer rim of the tractor wheel and properly spaced as shown, the bolts 19 passing through holes 21 in these bearing members and rigidly securing the housing plate 16 as well as the bearing member 20 in place.

The inverted U-shaped body portion of the retaining means is passed through the opening 3 of the wheel and through the opening 17 of the housing and the cross-bar then securely bolted in place and this cross bar at its ends will rest and rock at times on the upper edge of the side walls of the housing plate 16.

By referring to Fig. 2, it will be seen that the retaining member at times will extend further inwardly into the rim than at others, and the cross-bar will then assume the position as shown in Fig. 2, that is, when the shoe is in contact with the rim throughout its width.

Referring now for the moment to Fig. 4, showing an end view of the tread member 12, it will be seen that this tread member is formed of heavy pressed sheet metal which is so cut that a tooth 22 will be formed at one end of the shoe and two teeth 23 will be formed at the other end, thus presenting the teeth in staggered relation. The tread member is also so pressed as to provide the central longitudinally extending channel 24, the depth thereof being substantially the same as the length of the portion of the foot 8 which is bent outwardly as at 9.

The tooth 22 may be bulged as at 25 to add strength thereto, and this might also be done with the other teeth. The tread member is very similar to the tread member shown in the copending application above mentioned, but in this instance, it is provided with the channel 24 for the reception of the feet 8 of the retaining member 4. Holes are provided in the tread member so that rivets 26 may be passed through the tread member and through the openings 11 heretofore formed in the feet 8 of the retaining member 4.

It will be seen that as far as the specification has proceeded that both the retaining member and the tread member are preferably stamped metal articles, and after the dies have been made, both the tread members and the retaining members may be stamped out on an 80 to 100 ton press.

Referring now to the small bearings 20 as shown in Fig. 6, it will be seen that these members present a flat surface where they engage the outer surface of the tractor rim while on their opposite face are two lugs 28 which are slightly rounded and taper slightly toward the surface 27 so that they may, as the wheel revolves, fit within the small pockets 10 formed by bending the retaining member as described. Again, as the feet of the retaining member fit within the channel of the tread member, the weight of the wheel or tractor will be transferred to the bearing and to the tread members at a place where the feet are interposed between the tread member and the bearings, thus forming a very strong construction. Also, the construction overcomes any lateral motion of the tread members with regard to the rim.

The wearing action will fall upon the lugs 28 and as these bearing members are made of cast steel, the life of the shoe as a whole will be relatively great and, when the bearings do become worn, new ones may be easily put in their place.

Any wearing action on the cross bar 13 and the edges of the side walls 16 will be relatively slight, as when the weight of the wheel is on the shoe, the cross bar will be above the side walls of the housing 16 as this cross bar simply holds the retaining means in place as the wheel revolves.

From the foregoing it will be seen that I have devised a very economical form of tractor shoe, the several units being relatively light in weight, readily assembled, and readily placed in position.

Furthermore the parts which are subjected to the greatest wear may be quickly and readily renewed, and as the shoes and retaining means are preferably stamped, their cost is relatively low.

Also as the tread members and retaining means rock or oscillate with regard to the rim and assume the position shown in Fig. 1, two shoes are always on the surface of the ground to thereby double the traction.

Many slight changes might be made without in any way departing from the spirit and scope of the invention.

Having thus described my invention, what I claim as new and desire to secure by Letters Patent is:—

1. A tractor shoe comprising a tread member, a retaining means rigidly secured thereto, said retaining means adapted to pass through an opening in the rim of a wheel, further means adapted to be secured to the rim of the wheel to form a tooth action with said retaining means, and means capable of an inward and outward movement with relation to the rim secured within said retaining means and extending beyond the side walls of the opening to thereby support the retaining means and tread member in a rockable condition.

2. A tractor shoe comprising a tread member, a retaining means rigidly secured thereto, said retaining means being of substantially inverted U-shape, and adapted to pass through an opening in the rim of a wheel, further means adapted to be secured to the rim of the wheel cooperating with said retaining means to form a tooth action, means capable of an inward and outward movement with relation to the rim fitted within said U-shaped retaining means and extending beyond the opposite side walls of the opening to thereby support the retaining means and tread member and permit the tread member and retaining means to rock with relation to the rim of the wheel.

3. A tractor shoe comprising a tread member, a retaining means rigidly secured thereto, said retaining means being of substantially inverted U-shape, said retaining means adapted to extend through an opening in a wheel rim, further means adapted to be secured to the outer rim of the wheel to cooperate with said retaining means to form a tooth action, and a cross bar fitting within said retaining means and secured thereto and adapted to extend beyond the side walls of the opening in said rim to thereby retain and rockingly support the said retaining means and tread member on said wheel rim.

4. A tractor shoe comprising a tread member, a retaining means fitting within and rigidly secured to said tread member, said retaining means being of substantially inverted U-shape, said retaining means adapted to extend through an opening in a wheel rim, members adapted to be secured to the outer rim of the wheel to form a tooth action with said retaining means, a cross bar fitting within said retaining means and bolted thereto and adapted to extend beyond the side walls of the opening in said rim, a housing adapted to be secured to the wheel rim about the opening and forming a bearing for said cross bar and said retaining means and tread member capable of a rocking motion with regard to the wheel rim.

5. A tractor shoe comprising a tread member having a channel formed therein, a retaining means substantially in the shape of an inverted U and the retaining member having feet secured within the channel of the tread member, a portion of the retaining means adapted to extend through an opening in the rim of a wheel, means adapted to be placed about the opening to form a housing and a cross bar secured within the retaining means and supported by the walls of said housing to thereby support said retaining means and tread member and permit them to rock with relation to the rim and means adapted to be secured to the outer surface of the rim on the opposite sides of said opening to form a tooth action with the said retaining means.

6. In combination with a wheel rim provided with an opening, a plate provided with an opening and secured on the inner surface of the wheel rim and the two said openings registering, two tooth-like members secured to the rim of the wheel about said opening and cooperating with a retaining means for a tread member, a tread member provided with a channel, a retaining means substantially in the form of a loop and the outer ends of the loop fitting within the said channel and secured to the tread member, a portion of the loop fitting within the said openings, a cross bar secured in said loop and extending beyond the edges of the opening to thereby retain and loosely support the said retaining means and tread member.

7. In combination with a wheel rim provided with an opening, a plate provided with an opening and secured to the inner surface of the wheel rim and the two said openings registering, a tread member provided with a channel, a retaining means substantially in the form of a loop, the lower ends of the loop fitting within said channel and bent to form pockets and the said retaining means rigidly secured to said tread member, bearing members secured to the outer surface of the rim and adapted to rest within said pockets when said wheel revolves, a portion of the loop fitting within said openings and having a cross bar secured therein and extending beyond the edges of the opening in said plate to thereby retain and permit the said retaining means and tread member to oscillate with relation to the rim.

8. The combination of a wheel rim provided with an opening, a housing secured on the inner surface of the wheel rim and forming a bearing surface, means secured to the outer surface of the rim and spaced on the opposite sides of the said openings to form bearing members, a tread member provided with a channel and a retaining means secured in said channel, said retaining means having portions thereof to form pockets for the reception of said bearing members as the wheel revolves, and said retaining means adapted to pass through the opening in the rim and in said housing, and a cross bar bolted to said retaining means and extending beyond the side walls of the housing to thereby lock the retaining means and tread member to the rim of the wheel and to allow the tread member and retaining means to rock with relation to the wheel.

9. In combination with a wheel rim provided with an opening, a tread member, retaining means secured within the tread member, said retaining means substantially in the form of a loop and adapted to pass through an opening in said rim, means secured within the retaining means for holding the retaining means and tread to the rim of the wheel, bearings secured to the outer surface of the rim and resting on parts of the retaining means as the wheel revolves and the length of the retaining means being such that the tread member may move slightly inwardly and outwardly with relation to the rim of the wheel, and said tread member capable of an oscillating movement with regard to the rim of the wheel.

10. In combination with a wheel having an opening in its rim, a tread member having a longitudinal channel formed in its upper surface, a retaining means riveted within the channel and portions of the retaining means forming oppositely arranged pockets, bearings secured to the outer surface of the rim and on the opposite sides of said openings and spaced to fit within said pockets and rest on said retaining means as the wheel revolves, the inner end of said retaining means fitting within the opening in said rim, and means extending within and beyond the sides of the retaining means and the side walls of the opening to hold the retaining means and tread member to the wheel and to allow the tread member and retaining means to oscillate with relation to the wheel.

11. A tractor shoe comprising a retaining means formed of pressed metal substantially in the form of a loop and having its apex angular with relation to its sides, the ends of the loop being bent outwardly, a tread member provided with a channel and the ends of the loop riveted within the channel.

12. A tractor shoe comprising a retaining means formed of pressed metal substantially in the form of a loop, the ends of the loop being bent outwardly and inwardly to form pockets for the reception of bearing members, a tread member provided with a channel and the ends of the loop riveted within the channel, and a cross bar bolted in the apex of the loop and extending laterally outwardly beyond the sides thereof.

13. A tractor shoe comprising a retaining means formed of pressed metal substantially in the form of a loop, the ends of the loop being bent laterally outwardly, a tread member provided with a channel and the ends of the loop riveted within the channel, and a cross bar bolted in the apex of the loop and extending laterally outwardly beyond the sides thereof.

14. A tractor shoe comprising a tread member having a depressed portion, a retaining member having parallel oppositely extending feet riveted within the depressed portion of the tread member, the said retaining member comprising anticlinal spaced walls, a cross-bar fitting snugly within the apex of the spaced anticlinal walls and extending beyond the opposite sides of said spaced walls, and said cross-bar rigidly secured in position.

15. A tractor shoe comprising a tread member, a centrally disposed channel on its inner surface, a retaining member having spaced anticlinal walls and parallel oppositely extending feet riveted within the channel of the tread member, a cross bar substantially triangular in shape and snugly fitting the apex of the retaining member, said cross member bolted to said retaining member and the ends of the cross member extending beyond the sides of the retaining means.

In testimony whereof I affix my signature.

WILLIAM E. WINE.